US012416900B2

(12) United States Patent
Barman

(10) Patent No.: US 12,416,900 B2
(45) Date of Patent: Sep. 16, 2025

(54) METHOD FOR ASSEMBLING A GLASS WITH A WATCH CASE

(71) Applicant: ETA SA MANUFACTURE HORLOGÈRE SUISSE, Grenchen (CH)

(72) Inventor: Frédéric Barman, Aproz (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 399 days.

(21) Appl. No.: 18/183,508

(22) Filed: Mar. 14, 2023

(65) Prior Publication Data

US 2023/0315021 A1 Oct. 5, 2023

(30) Foreign Application Priority Data

Apr. 5, 2022 (EP) .................................... 22166760

(51) Int. Cl.
*G04B 39/02* (2006.01)

(52) U.S. Cl.
CPC .................................... *G04B 39/02* (2013.01)

(58) Field of Classification Search
None
See application file for complete search history.

(56) References Cited

U.S. PATENT DOCUMENTS 3,704,584 A * 12/1972 Fujimori ................ G04B 39/02 368/291

FOREIGN PATENT DOCUMENTS

| | | | | | |
|---|---|---|---|---|---|
| CH | 573620 | B5 | | 3/1976 | |
| CH | 709838 | A2 | * | 1/2016 | G04B 37/05 |
| CH | 712078 | A2 | * | 7/2017 | G04B 37/00 |
| CH | 713959 | A2 | * | 1/2019 | G04B 39/02 |
| JP | 56-27686 | U | | 3/1981 | |

OTHER PUBLICATIONS

European Search Report of EP 22166760.3 dated Aug. 25, 2022.

* cited by examiner

*Primary Examiner* — Regis J Betsch
*Assistant Examiner* — Michael James Walker
(74) *Attorney, Agent, or Firm* — Sughrue Mion, PLLC

(57) ABSTRACT

A method for assembling a glass (26) to a case (4) by bonding provides for a flange (18) that is separate from the case and sized so as to be able to be forcibly inserted into an opening in the case, this opening bounding an annular surface (13) on the inside. The flange is partially inserted into the opening and the adhesive (20*a*) is applied to the annular surface, then the glass is correctly placed on the flange and pressure is exerted on the glass such that the insertion of the flange into said opening continues until the adhesive covers a peripheral lower surface (25) of the inner face (27) of the glass facing the annular surface. Finally, the adhesive hardens and thus forms a tight joint between the glass and the watch case.

10 Claims, 1 Drawing Sheet

METHOD FOR ASSEMBLING A GLASS WITH A WATCH CASE

CROSS REFERENCE TO RELATED APPLICATIONS

This application is claiming priority based on European Patent Application No. 22166760.3 filed on Apr. 5, 2022.

TECHNICAL FIELD OF THE INVENTION

The invention relates to a method for assembling a glass with a watch case, more particularly a glass provided above an analogue time display.

Within the scope of the invention, the glass is intended to be fastened to the case by bonding to form a watch. In the advantageous case where the case comprises a part forming a bezel, the assembly is preferably carried out without an elastomer gasket between the side wall of the glass and the inner wall of the bezel located facing this side wall.

TECHNOLOGICAL BACKGROUND

The fastening of a watch-glass, in particular a crystal glass, by bonding has been proposed for various watches, in particular for designs without an upper rim of the case radially surrounding the glass, i.e. without a conventional bezel. Such an embodiment is proposed, for example, in the Swiss patent No. 622 151, which describes a watch case formed by a middle having a horizontal upper face to which a sapphire glass is bonded by the peripheral zone of the inner face thereof, which is situated facing the horizontal upper face of the middle. To hide the adhesive from the view of a user observing the finished watch, the glass can have a thin, opaque, metal coating in said peripheral zone of the glass which is highly adherent to the adhesive selected for the assembly. This coating can be provided such that it extends inwardly slightly beyond said peripheral zone, so as to also mask the edge of the dial from an axial view through the glass.

This document discloses a technique for improving the aesthetic appearance of the assembled 'case and glass' assembly, i.e. a machining, including grinding, of the side surface of the glass and of the top of the outer surface of the middle. This provides a continuous surface between the side surface of the glass and the middle, and furthermore, such machining removes any adhesive residue that may have run outside the horizontal upper face, which is very likely. It should be noted that the removal of excess adhesive on the outside of the case can also be achieved by other means, such as using a chemical. However, a major problem arises as the adhesive can run inside the case, into the space between the dial and the glass for an analogue time display, in particular along the inner vertical surface of the middle delimiting this space. This is why the view into this space has been reduced by the masking metal coating that extends over the zone located at the edge of the dial.

The Japanese patent No. S56-27686 U describes various alternative embodiments of an upper part of a watch case arranged to receive a glass and the fastening thereof to the case by bonding. The upper part defines an annular surface which is bonded to a lower surface of the glass. The adhesive readily spills from the inner side of the annular surface along a side surface defining an enclosed space under the glass and visible through the glass, such that any spillage of adhesive from the central side of the watch, as shown in the first figure, is clearly visible.

The French patent No. 2524992 describes, with reference to its FIGS. 1 to 3, a watch with a glass bonded to a flange, which is fastened to a middle by claws. In the alternative embodiment shown in FIG. 3, a projecting part of the case, forming an upper rim of the middle, covers the side surface of the glass. A groove between the outer vertical surface of the flange and the projecting part allows excess adhesive to run into this groove. This solves the problem of excess adhesive on the outside of the flange, as long as the top of the groove can be uniformly covered with adhesive; however, another problem arises because the flange is thus bonded to the case, which makes it difficult to remove the 'flange and glass' assembly in the event that, for example, the glass must be replaced, in particular if this glass potentially becomes cracked. The problem of excess adhesive being able to run along the inner side surface of the flange, which is visible through the glass, remains unresolved in the French patent No. 2524992.

SUMMARY OF THE INVENTION

The primary aim of the present invention is to solve the aforementioned problem in connection with bonding a glass to an annular shoulder, in particular a horizontal annular surface, of a watch case, while preventing the adhesive from running into the enclosed space provided for the display, in particular an analogue display, of the watch. A secondary aim is to achieve the primary aim while ensuring that the annular surface of the watch case, which is intended to be bonded to a peripheral lower surface of the inner face of the glass, can receive sufficient adhesive to ensure that this annular surface is fully, and preferably uniformly, covered with adhesive.

To this end, the invention relates to a method for assembling a glass to a case to form a watch, the case having an annular surface which is intended to be bonded to a peripheral lower surface of an inner face of the glass. The watch comprises a flange having an upper surface and sized to be able to be forcibly inserted, along an insertion axis, along an inner axial surface of an upper part of the case, the inner axial surface bounding the annular surface on the central side of the case.

The assembly method comprises the following steps of:

partially inserting the flange into an opening defined by said inner axial surface;

depositing an adhesive on the annular surface of the case and/or on said peripheral lower surface;

followed by the following steps of:

bringing the glass against the upper surface of the flange in a final horizontal position of the glass in which the peripheral lower surface thereof is axially superimposed on the annular surface, the upper surface of the flange thus being in contact with a contact surface of the inner face of the glass adjacent to the peripheral lower surface, this contact surface and the upper surface of the flange being configured such that there is at least one continuous annular contact zone between these two surfaces;

exerting an axial pressure on an outer face of the glass with an intensity that allows the insertion of the flange into said opening to gradually continue until the upper surface of the flange has reached a final axial position, which position is provided above said annular surface, and until the peripheral lower surface of the glass is covered by the adhesive so as to form a continuous ring of adhesive between said annular surface of the case and the peripheral lower surface of the glass;

hardening the adhesive to form a tight joint.

According to an advantageous alternative embodiment, at the end of the step of exerting an axial pressure on the outer face of the glass, the upper surface of the flange is located axially above the annular surface of the case, at an axial distance of greater than 20 μm and less than 100 μm. To this end, in one particular alternative embodiment, the case comprises a shoulder forming an axial banking for the flange. Preferably, the banking defines an annular stop surface which is continuous and parallel to a lower surface of the flange, which bears against the entire continuous annular stop surface at the end of the step of exerting an axial pressure on the outer face of the glass.

In another advantageous alternative embodiment, said inner vertical surface is parallel to at least one continuous annular zone of an outer side surface of the flange, which is configured such that this continuous annular zone is continuously in contact with the inner vertical surface once this continuous annular zone has been inserted along this inner vertical surface.

According to a main embodiment, the upper part of the case comprises a projecting part forming a rim defining a side wall which rises axially from the outer periphery of said annular surface, this side wall radially surrounding the glass at the end of the step of exerting an axial pressure on the outer face of the glass. In an advantageous alternative embodiment, some of the adhesive rises into a groove left between a side face of the glass and the side wall of the rim, the tight joint formed completely covering said annular surface and at least partially filling the groove.

BRIEF DESCRIPTION OF THE FIGURES

The invention will be described in more detail hereinafter with reference to the accompanying drawings, given by way of examples that are in no way limiting, in which.

DETAILED DESCRIPTION OF THE INVENTION

Figure 1:
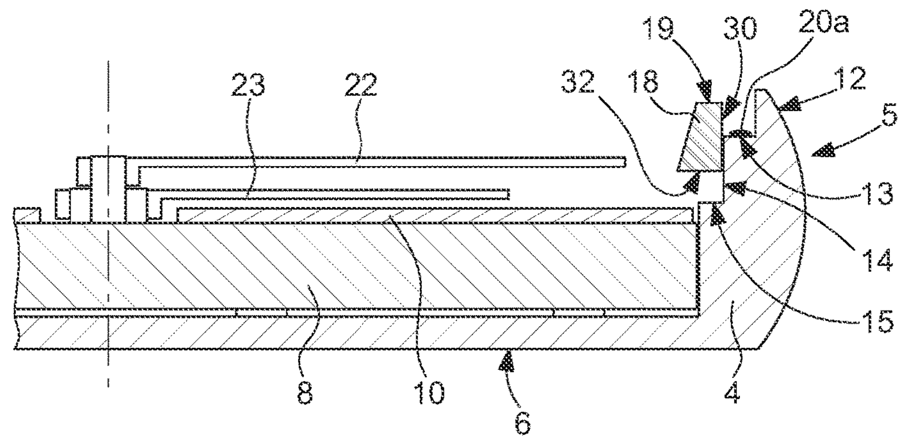
FIG. 1 shows a watch case and a flange in a first intermediate state which occurs during the assembly method according to the invention.
Figure 2:
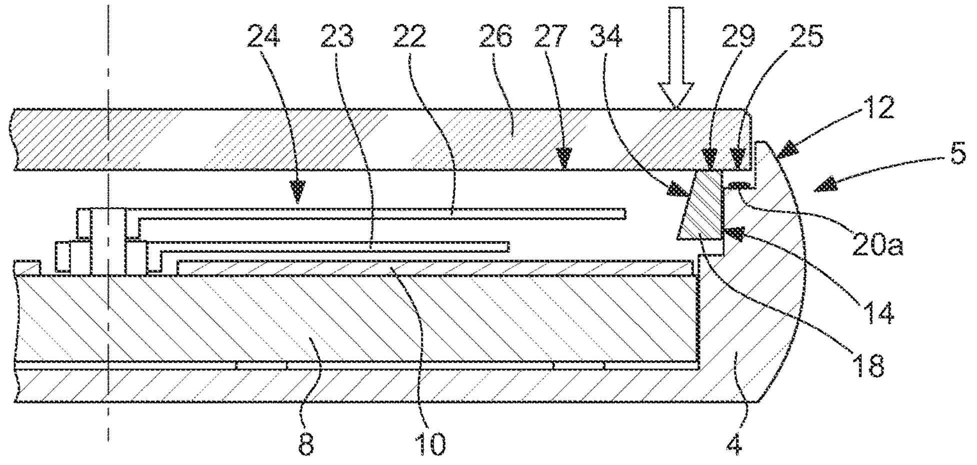
FIG. 2 shows the case, the flange and a glass in a second intermediate state which occurs during the assembly method according to the invention.
Figure 3:
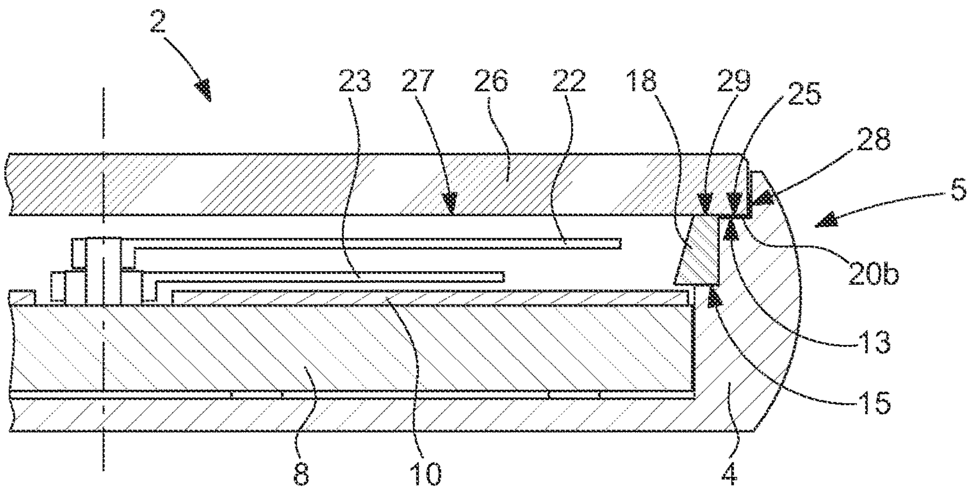
FIG. 3 shows the case, the flange and the glass in a final state resulting from the assembly method according to the invention.

A main implementation of the method for assembling a glass to a case according to the invention, to form a watch, will be described hereinbelow with reference to the accompanying figures.

The case 4, intended for the watch 2, is formed in one piece defining a back 6 and a middle-bezel. Other alternative embodiments with a separate back and/or a bezel separate from the middle can also be considered. It should be noted that, in the description of the invention, the terminology used distinguishes, for the sake of clarity, between the case 4, the flange 18 and the glass 26, which thus form three distinct elements that are initially separate. The case comprises an upper part 5 which has a first shoulder defining an annular surface 13, which is horizontal in the described alternative embodiment. 'Horizontal surface' is understood to mean a surface perpendicular to a central axis of the case 4. This annular surface is intended to be bonded to a peripheral lower surface 25 of an inner face 27 of the glass

26, the peripheral lower surface defining a surface parallel to this annular surface. In other alternative embodiments, the peripheral lower surface of the glass is parallel as a whole to the annular surface, this annular surface or the peripheral lower surface being parallel except, for example, in a median annular zone where an annular slot is provided, situated substantially in the middle of the width of the annular surface, to form a hollow for receiving an adhesive 20*a* provided for assembling the glass to the case and thus to form a median zone of the tight joint 20*b*, obtained following this assembly, with a greater thickness of adhesive.

Subsequently, the upper part 5 of the case 4 defines an inner vertical surface 14 which bounds the annular surface 13 on the inside of the case, this inner vertical surface descending from the inner periphery of the annular surface. The upper part 5 comprises a projecting part forming a rim 12, which defines a side wall 28 which rises vertically from the outer periphery of the annular surface 13, this vertical side wall being intended to radially surround, in a conventional manner, the glass 26 once the latter is placed in the upper opening in the bezel of the case 4 to close this case. It should be noted that the adjective 'vertical' and the adverb 'vertically' respectively mean 'axial' and 'axially', i.e. along a central axis of the watch case. The watch 2 further comprises a flange 18 which is separate from the upper part 5 of the case and which is dimensioned so that it can be forcibly inserted, along an insertion axis coincident with the central axis of the case, into an opening in the upper part 5, along the inner vertical surface 14 which defines this opening. This inner vertical surface limits the annular surface on the central side of the case. The flange 18 has an upper surface 19 which is provided facing a contact surface 29 of the inner face 27 of the glass once the glass has been mounted in the case, this contact surface 29 being adjacent to the peripheral lower surface 25. In general, the upper surface 19 and the contact surface 29 are configured so that there is at least one continuous annular contact zone between these two surfaces when the glass 26 is applied against the flange 18 once this glass has been inserted into the recess formed by the upper opening in the bezel of the case 4. Preferably, the upper surface 19 and the contact surface 29 of the glass are parallel.

The case further comprises a second shoulder forming a banking 15 for the flange 18. It should be noted that the banking, intended to define a final axial position of the flange 18 or a lower bound for this flange, can also be formed by a casing ring provided for the movement 8, by the movement itself or by the dial 10 arranged above the movement. However, given the manufacturing tolerances of each part as well as the assembly tolerances of the various elements to be fitted in the case, the banking intended for the flange 18 is preferably formed by the case itself. More generally, the annular surface 13 and the banking 15 are advantageously defined by the same part, which makes it possible to precisely manage the axial distance between the annular surface 13 and the banking 15. This advantage will become more apparent in the following description given of the assembly method according to the invention. The banking 15 defines an annular stop surface which is parallel to a lower surface 32 of the flange, which is located facing this annular stop surface once the flange has been inserted along the inner vertical surface 14 of the case 4. Preferably, the inner vertical surface 14 of the case 4 is parallel to at least one continuous annular zone of the outer side surface 30 of the flange, which is configured such that this continuous annular zone is continuously in contact with the inner vertical surface 14 once this continuous annular zone has been inserted along the inner vertical surface. In an advantageous alternative embodiment, the continuous annular zone is formed by a lower part of the outer side surface 30 of the flange. In a specific alternative embodiment, the inner vertical surface 14 of the case 4 is parallel to the outer side surface of the flange, at least to the part of this outer side surface that is provided facing the inner vertical surface once the flange is in its final position in the case 4.

In order to form the watch 2, a movement 8 with a dial 10 is firstly introduced into the case 4, this movement being provided with a minute hand 22 and an hour hand 23 forming an analogue time display 24.

The method for assembling the glass 26 to the case 4 comprises the following two steps of:

partially inserting the flange 18 into the opening defined by the inner vertical surface 14 over an axial distance which is less than the height of the flange, the upper surface 19 of the flange being positioned, as a result of this partial insertion, above the annular surface 13 and above an intended final axial position of this upper surface;

depositing an adhesive 20*a* on the annular surface 13 of the case and/or on the peripheral lower surface 25 of the glass;

followed by the following three steps of:

bringing the glass 26 against the upper surface 19 of the flange 18 and positioning this glass substantially in a final horizontal position, in which the annular surface 13 of the case is axially superimposed on the peripheral lower surface 25 of the glass, and such that the upper surface of the flange is in contact with a contact surface 29 of the inner face 27 of the glass, the contact surface and the upper surface of the flange being configured such that there is at least one continuous annular contact zone between these two surfaces;

exerting an axial pressure on the outer face of the glass with an intensity that allows the insertion of the flange 18 into the corresponding opening, defined by the inner vertical surface 14, to gradually continue until the peripheral lower surface 25 of the glass is covered by the adhesive 20*a* so as to form a continuous ring of adhesive between the annular surface 13 of the case and the peripheral lower surface 25 of the glass, and until the upper surface 19 of the flange has reached said final axial position, which position is provided above said annular surface 13; and hardening the adhesive to form a tight joint 20*b*.

Thanks to the features of the method for assembling the glass to the case according to the invention, no adhesive runs along the inner side face 34 of the flange 18. It should be noted that the introduction of the movement 8 with the dial 10 from above can, in one alternative embodiment, take place between the deposition of the adhesive and the partial insertion of the flange mentioned hereinabove. In one alternative embodiment wherein the case comprises a back which is intended to be removable from the middle, the introduction of the movement and the dial with the analogue display can take place from below, i.e. through an opening intended to be closed by the back, after the assembly method.

In an advantageous alternative embodiment, the flange 18 is brought to bear against the banking 15 at the end of the step of exerting an axial pressure on the outer face of the glass. The lower surface 32 of the flange thus rests against an entire annular stop surface, which is defined by the banking. In another alternative embodiment, a banking for the flange can be formed by the dial 10. However, as already mentioned, the latter alternative embodiment presents tolerance problems, meaning that it is more difficult to be able to properly manage the final level of the upper surface 19 of the flange at the end of the axial pressure step.

In another advantageous alternative embodiment, at the end of the step of exerting an axial pressure on the outer face of the glass, the upper surface 19 of the flange 18 is located axially above the annular surface 13 of the case, at an axial distance of greater than 20 microns (20 μm) and less than or equal to 100 microns (100 μm). In particular, given the manufacturing tolerances, an axial distance of between 60 and 70 microns (60-70 μm) is taken, for example, as a setpoint value. This ensures that the tight joint 20*b*, formed by the adhesive 20*a* and obtained after the adhesive hardening step, has a certain non-zero thickness.

In a first alternative embodiment of another implementation of the assembly method, a certain thickness of the adhesive joint 20*b* can be obtained by patterning the annular surface 13 or the corresponding peripheral lower surface 25. In particular, the annular surface has a patterning defining concave zones and/or paths for the adhesive 20*a*. In a second alternative embodiment, spacers, in particular small beads (for example balls with a diameter of between 50 and 150 micrometres), are introduced into the adhesive. The spacers are incorporated into the adhesive 20*a* to guarantee a minimum thickness of the tight joint 20*b* over the entire annular surface 13. This other implementation of the invention not only ensures that the adhesive forming the tight joint has a certain non-zero thickness, but also that this thickness is substantially constant. Thus, the thickness of the adhesive before hardening can be properly managed. It can be seen that in this other implementation, the presence of a banking 15 to determine a final axial position of the flange is not essential in preventing the flange from ultimately arriving at the same level as the annular surface 13, since it is the aforementioned patterning or the spacers, in particular glass beads or synthetic beads, that ensure that the axial pressure exerted on the glass 26 does not bring these two surfaces to the same level, i.e. into the same axial position.

The axial pressure exerted on the outer face of the glass 26 is preferably maintained at least during a first part of the step of hardening the adhesive 20*a*.

In the alternative embodiment shown in the figures, as already indicated, the upper part 5 of the case 4 comprises a projecting part forming a rim 12 which defines a side wall 28 rising axially from the outer periphery of the annular surface 13, this side wall radially surrounding the glass 26 at the end of the step of exerting an axial pressure on the outer face of the glass. Preferably, the amount of adhesive 20*a* provided in the step of depositing an adhesive is designed such that, in the step of exerting an axial pressure on the outer face of the glass, some of the adhesive rises into a groove left between a side face of the glass and the side wall 28 of the rim 12. Thus, the tight joint 20*b* completely covers the annular surface 13 and at least partially fills the groove. This groove thus acts as a reservoir for receiving excess adhesive, in addition to also helping to fasten the glass 26 to the case 4 by bonding and to ensure that the resulting adhesive joint 20*b* is sufficiently tight.

The invention claimed is:

1. A method for assembling a glass to a case to form a watch, the case having an annular surface which is configured to be bonded to a peripheral lower surface of an inner face of the glass; wherein the watch comprises a flange having an upper surface and sized to be able to be forcibly inserted, along an insertion axis, along an inner axial surface of an upper part of the case, the inner axial surface bounding the annular surface on the central side of the case;

the assembly method comprising the following steps of:

partially inserting the flange into an opening defined by said inner axial surface;

depositing an adhesive on the annular surface of the case and/or on said peripheral lower surface;

followed by the following steps of:

bringing the glass against the upper surface of the flange in a final horizontal position of the glass in which the peripheral lower surface thereof is axially superimposed on the annular surface, the upper surface of the flange thus being in contact with a contact surface of the inner face of the glass adjacent to the peripheral lower surface, this contact surface and the upper surface of the flange being configured such that there is at least one continuous annular contact zone between these two surfaces;

exerting an axial pressure on an outer face of the glass with an intensity that allows the insertion of the flange into said opening to gradually continue until the upper surface of the flange has reached a final axial position, which position is provided above said annular surface, and until the peripheral lower surface of the glass is covered by the adhesive so as to form a continuous ring of adhesive between said annular surface of the case and the peripheral lower surface of the glass; and hardening the adhesive to form a tight joint.

2. The assembly method according to claim 1, wherein the case comprises a shoulder forming a banking for the flange.

3. The assembly method according to claim 2, wherein the banking defines an annular stop surface which is continuous and parallel to a lower surface of the flange, which bears against the entire continuous annular stop surface at the end of the step of exerting an axial pressure on the outer face of the glass.

4. The assembly method according to claim 1, wherein said inner vertical surface is parallel to at least one continuous annular zone of an outer side surface of the flange, which is configured such that this continuous annular zone is continuously in contact with the inner vertical surface once this continuous annular zone has been inserted along this inner vertical surface.

5. The assembly method according to claim 1, wherein the axial pressure on the outer face of the glass is maintained at least during a first part of the step of hardening the adhesive.

6. The assembly method according to claim 1, wherein, at the end of the step of exerting an axial pressure on the outer face of the glass, said upper surface is located above said annular surface, at an axial distance of greater than 20 micrometres and less than 100 micrometres.

7. The assembly method according to claim 1, wherein the annular surface of the case or the peripheral lower surface of the glass has a pattern defining concave zones and/or paths for the adhesive.

8. The assembly method according to claim 1, wherein spacers are incorporated into the adhesive so as to guarantee a minimum thickness of the tight joint over the entire annular surface.

9. The assembly method according to claim 1, wherein the upper part of the case comprises a projecting part forming a rim defining a side wall which rises axially from the outer periphery of said annular surface, this side wall radially surrounding the glass at the end of the step of exerting an axial pressure on the outer face of the glass.

10. The assembly method according to claim 9, wherein the amount of adhesive provided in the step of depositing an adhesive is designed such that, in the step of exerting an axial pressure on the outer face of the glass, some of the adhesive rises into a groove left between a side face of the glass and the side wall of the rim, said tight joint formed completely covering said annular surface and at least partially filling the groove.

* * * * *